May 30, 1950 — F. O. WISMAN — 2,509,662

GENERATOR

Filed Aug. 29, 1946

INVENTOR
FRANKLIN O. WISMAN.
BY Cecil D Arens
ATTORNEY.

Patented May 30, 1950

2,509,662

UNITED STATES PATENT OFFICE 2,509,662

GENERATOR

Franklin O. Wisman, South Bend, Ind., assignor to Bendix Aviation Corporation, South Bend, Ind., a corporation of Delaware Application August 29, 1946, Serial No. 693,778

2 Claims. (Cl. 322—46)

This invention relates to electrical machinery and more particularly to a machine for generating alternating current.

The device of the invention is primarily for use on velocipedes, power operated bicycles, and motorcycles or the like, to supply energy to the lighting systems thereof. Many velocipedes, as well as power propelled machines, use batteries, while others use electrical generators directly connected to the lighting systems of these machines to supply the electrical energy therefor. Although batteries provide a continuous supply of energy regardless of the speed of the machine, they are objectionable, since they require constant vigilance. Most lighting systems of the aforementioned variety having a generator directly connected to the system are objectionable from the standpoint of current fluctuations in the system between minimum and maximum speed of the driving machine. That is, on a power propelled bicycle, for example, at idle speed the intensity of the lights will be only a glow and will not reach full intensity until near maximum speed of the engine is reached. This is due to a great extent to poor output regulation of the generator.

It is therefore an important object of the invention to provide a generator having optimum output regulation within a predetermined range.

A still further object of the invention resides in one provision of a generator the output regulation of which is controlled by a capacitor arranged to influence the working magnetic flux of the generator.

Another very important object of the invention resides in the provision of a generator the output regulation of which is controlled by means arranged in series with the generator winding to thereby produce magnetizing current below resonance and demagnetizing current above resonance.

A yet further object of the invention is to provide a generator the output regulation of which is controlled by producing currents in the generator having a time relationship such that the resultant MMF will aid or oppose the main field flux.

A more important object of the invention is to provide a generator having an impedance constructed and arranged in series with the main winding to add to or subtract from the total circuit impedance to control the output regulation and to vary the phase angle of the total circuit impedance.

An important object of the invention is to provide a generator having a main field winding, a permanent magnet for supplying flux linkages thereto and a secondary winding inductively related to the main field winding and including means for producing an MMF which aids the MMF of the field winding below resonance, as at low speeds and opposes the same above resonance, as at high speeds.

Another object of the invention is to provide a generator of this character, which is simple, compact, and closely organized in construction, easy and comparatively inexpensive to manufacture and reliable in operation.

The above and other objects and features of the invention will be apparent from the following description of the apparatus taken in connection with the accompanying drawing which forms a part of this specification, and in which.

Figure 1:
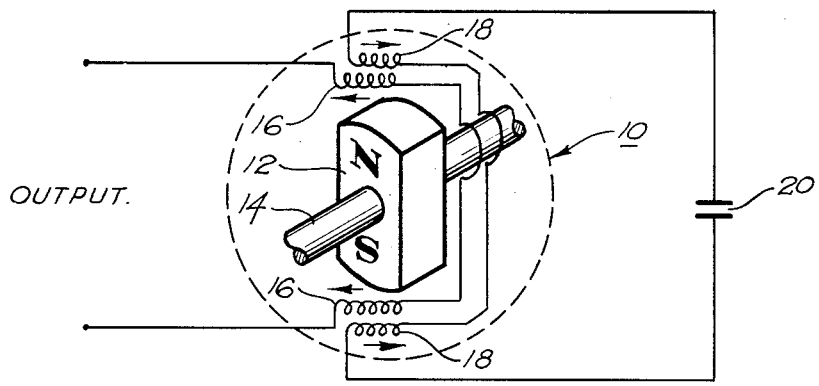
Figure 1 is a diagrammatic representation of the preferred embodiment of the invention.

Referring now to Figure 1 of the drawing, reference numeral 10 designates a generator having a rotating permanent magnet rotor 12 carried by a shaft 14 adapted to be rotated. A stator winding 16 is disposed relative to the rotor to receive flux therefrom in a manner to cause the flux to link the winding to induce an electromotive force therein proportional to rotor speed. This winding is connected to the generator output as shown. A second or auxiliary winding 18 is wound over the stator winding and inductively related thereto. A condenser or capacitor 20 is in circuit in series with the second winding. The construction and arrangement of the capacitor in circuit with the second winding is such as to produce a current having a time relationship with respect to the E. M. F. induced in the stator winding to either aid or oppose the rotor magnet poles. That is, the MMF produced by the rotor magnet is either increased or decreased by the current in the second winding depending upon whether the generator output frequency is below or above a preselected resonance.

The second winding and condenser are so constituted and associated with the stator winding that current in the second winding will have a magnetizing effect on the stator frame below resonance frequency and a demagnetizing effect thereon above resonance frequency, whereby output regulation is obtained. This can be explained on the basis that since the capacitance reactance varies inversely as the frequency or speed of the rotor there will be a leading current produced in the second winding below a predetermined resonance frequency, and as the rotor speed increases to cause the resonance frequency to increase beyond the predetermined resonance frequency the capacitance reactance becomes less and the inductance reactance becomes greater to thereby produce a lagging current in the second winding.

Figure 2:
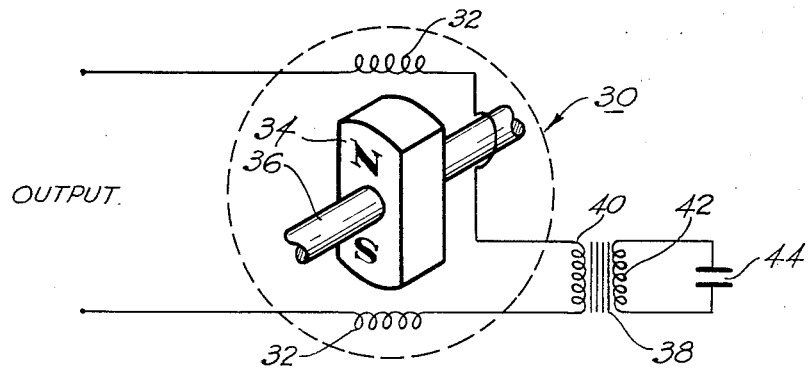
Figure 2 is a diagrammatic representation of a modified form of the device of the invention.

Figure 2 is a modified embodiment of a generator 30, having a stator winding 32 disposed to receive flux linkages emanating from a permanent magnet rotor 34, suitably secured to a shaft 36 adapted for rotation. The winding 32 is connected to an output, as shown and has an impedance 38 in series therewith. The impedance 38 comprises a transformer having its primary winding 40 in series with winding 32 and a secondary winding 42 in series with a capacitor or condenser 44. Here, as in Figure 1, the arrangement is such as to produce magnetizing current below resonance frequency and demagnetizing current above resonance frequency to thereby regulate the output. It should be noted that the series impedance 38 either adds to or subtracts from the total circuit impedance to control output regulation and to vary the phase angle of the total circuit impedance.

Figure 3:
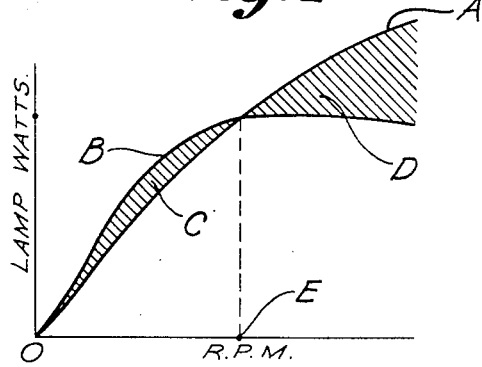
Figure 3 is a curve showing the output regulation.

Figure 3 shows a curve A which illustrates the unregulated output and a curve B which illustrates the output regulation obtained in accordance with the device of the invention. The area C between curves A and B represents the magnetizing effect available at frequencies below resonance frequency and area D represents the demagnetizing effect available above resonance frequency. OE indicates the speed at which resonance occurs.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A generator comprising a stator winding, a rotatable permanent magnet rotor constructed and arranged for furnishing flux which links the winding in a manner to induce an E. M. F. therein proportional to rotor speed within a preselected range, a second winding inductively related to said stator winding, and a capacitor constructed and arranged in circuit with said second winding to produce a current therethrough having a time relationship with respect to the output current through said stator winding to either aid or oppose said current, whereby the output is regulated.

2. A generator comprising a stator frame with a winding thereon, a rotatable permanent magnet rotor constructed and arranged for furnishing flux which links the winding in a manner to induce an E. M. F. therein proportional to rotor speed within a preselected range, a second winding wound over the stator winding so as to be inductively related thereto, and a capacitor in the second winding in series therewith, said capacitor and second winding forming a resonant circuit so dimensioned that the current through the second winding will have a magnetizing effect on the stator frame below resonance frequency and a demagnetizing effect thereon above resonance frequency, whereby regulation of the output is obtained.

FRANKLIN O. WISMAN.

REFERENCES CITED

The following references are of record in the file of this patent:

UNITED STATES PATENTS

| Number | Name | Date |
|---|---|---|
| 1,513,633 | Scheller | Oct. 28, 1924 |
| 2,218,859 | Schweitzer | Oct. 22, 1940 |
| 2,349,308 | Rhyne | May 23, 1944 |

---

Notice

In an interference involving Patent No. 2,509,662, F. O. Wisman, Generator, final judgment adverse to the patentee has been rendered as to claim 1.

---

Disclaimer 2,509,662.—*Franklin O. Wisman*, South Bend, Ind. GENERATOR. Patent dated May 30, 1950. Disclaimer filed June 10, 1953, by the assignee, *Bendix Aviation Corporation*.
Hereby enters this disclaimer to claim 1 of said patent.
[*Official Gazette August 4, 1953.*]